US009838622B2

(12) United States Patent
Tao et al.

(10) Patent No.: US 9,838,622 B2
(45) Date of Patent: Dec. 5, 2017

(54) FLICKER DETECTION USING SEMICONDUCTOR LIGHT SOURCE

(71) Applicant: Apple Inc., Cupertino, CA (US)

(72) Inventors: Douglas K Tao, San Jose, CA (US); Anup K Sharma, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/827,141

(22) Filed: Aug. 14, 2015

(65) Prior Publication Data
US 2016/0269656 A1  Sep. 15, 2016

Related U.S. Application Data

(60) Provisional application No. 62/133,108, filed on Mar. 13, 2015.

(51) Int. Cl.
H04N 5/353 (2011.01)
H04N 5/225 (2006.01)
H04N 5/235 (2006.01)

(52) U.S. Cl.
CPC ......... H04N 5/3532 (2013.01); H04N 5/2256 (2013.01); H04N 5/2357 (2013.01)

(58) Field of Classification Search
CPC ... H04N 5/3532; H04N 5/2256; H04N 5/2357
USPC ........................................................ 396/518
See application file for complete search history.

(56) References Cited

U.S. PATENT DOCUMENTS

| 7,289,144 B2 | 10/2007 | Arazaki |
| 8,068,148 B2 | 11/2011 | Noyes et al. |
| 8,648,929 B2 | 2/2014 | Ho et al. |
| 8,711,245 B2 | 4/2014 | Kinrot et al. |

(Continued)

FOREIGN PATENT DOCUMENTS

WO  2007/049900  5/2007

OTHER PUBLICATIONS

I2C—Bus: What's that?, http://www.i2c-bus.org/i2c-bus/, accessed Nov. 16, 2016.*

(Continued)

Primary Examiner — Clayton E Laballe
Assistant Examiner — Linda B Smith
(74) Attorney, Agent, or Firm — Robert C. Kowert; Meyertons, Hood, Kivlin, Kowert & Goetzel, P.C.

(57) ABSTRACT

Devices and methods for adjusting an exposure window of a rolling shutter based on a frequency determined from ambient light gathered by a bimodal component are disclosed. Flickering light sources may cause artifacts in captured images, due to interplay between a period of a frequency of ambient light and the exposure window. An image capture device includes a semiconductor component configured to operate in two modes and an exposure window control component configured to compensate for the flickering based on a signal from the light source. In a sensor mode, the semiconductor component may operate to detect the frequency of ambient light. To avoid image artifacts, the frequency of the ambient light is analyzed and an exposure time is adjusted to an integer multiple of the period of the frequency such that exposure is matched to the periodic illumination of the flickering light source.

20 Claims, 12 Drawing Sheets

(56) References Cited

U.S. PATENT DOCUMENTS

| | | | |
|---|---|---|---|
| 2003/0019152 A1* | 1/2003 | Raun | A01C 21/007 47/58.1 SC |
| 2004/0051791 A1* | 3/2004 | Hashimoto | G06K 9/00013 348/226.1 |
| 2004/0201729 A1 | 10/2004 | Poplin et al. | |
| 2007/0139345 A1 | 6/2007 | Shie et al. | |
| 2007/0284708 A1* | 12/2007 | Hanya | H01L 31/0203 257/676 |
| 2010/0134650 A1* | 6/2010 | Kim | H04N 5/2351 348/229.1 |
| 2011/0181753 A1 | 7/2011 | Sugie | |
| 2011/0255786 A1* | 10/2011 | Hunter | H04N 5/21 382/190 |
| 2012/0200734 A1* | 8/2012 | Tang | H04N 5/23245 348/223.1 |
| 2012/0236175 A1* | 9/2012 | Kinrot | H04N 5/2357 348/226.1 |
| 2012/0313535 A1* | 12/2012 | Bedell | H05B 37/0227 315/158 |
| 2014/0186052 A1* | 7/2014 | Oshima | H04B 10/1143 398/130 |
| 2014/0214362 A1 | 7/2014 | Chen et al. | |
| 2015/0281905 A1* | 10/2015 | Breuer | H04W 4/026 398/118 |

OTHER PUBLICATIONS

U.S. Appl. No. 62/133,108, filed Mar. 13, 2015, Douglas K. Tao.

International Search Report and Written Opinion from PCT/US2016/021348, dated Jun. 3, 2016, Apple Inc., pp. 1-14.

"Using LEDs as Light-Level Sensors and Emitters", Oct. 2009, Ver. 2.1, Retrieved from URL: https://www.altera.com/content/dam/altera-www/global/en_US/pdfs/literature/wp/wp-01076-led-driver-reduces-power-adjusting-intensity-ambient-light.pdf, pp. 1-6.

* cited by examiner

FLICKER DETECTION USING SEMICONDUCTOR LIGHT SOURCE

PRIORITY CLAIM

The present application claims benefit of priority to U.S. Provisional Application No. 62/133,108 titled "Flicker Detection Using Semiconductor Light Source," filed on Mar. 13, 2015, which is hereby incorporated by reference in its entirety as though fully and completely set forth herein.

BACKGROUND

Technical Field

This disclosure relates generally to capturing images, and, more specifically, to compensating for aberrations in ambient lighting at the time of image capture.

Description of the Related Art

Image capture devices can suffer from poor performance when they are asked to capture high quality images across a wide variety of environments. For example, image capture devices have a relatively small number of features to call upon in order to affect the lighting of objects in the field of view. Generally, some sort of light source, such as a flash bulb or light-emitting diode (LED), or some other sort of lamp may be provided with portable image capture devices such that the devices can add lighting to the scene being captured.

However, some scenes that have sufficient lighting may suffer from ambient lighting with characteristics that may be detrimental to providing high-quality, visually appealing images. Under such circumstances, adding additional light from a devices LED flash unit may cause overexposure or may otherwise add to the detrimental characteristics of the ambient light (e.g., saturation in high illumination).

For example, some sources of indoor ambient light, such as fluorescent light bulbs have the illuminations characteristic of flickering on and of (e.g., at about 60 Hz AC). Fluorescent lamps may also have spectral roll. LED and other light sources may modulate at different frequencies (e.g., 100 Hz-2 KHz or higher) for example. Such on/off behavior may adversely affect the captures of images. Short camera exposures do not integrate sufficient time to low pass filter the ambient light and rolling shutter exposure mode causes exposure "beats" with illumination frequency. In some systems, a camera may be synchronized with the frequency of the AC electrical source that provides the ambient light. However, the frequency of the AC electrical source is not readily available to portable devices. In other systems, the captured image may be analyzed to determine the frequency and the exposure of subsequent images may be limited to a multiple of the period of the frequency. However, such a method is not helpful for preventing artifacts in the analyzed image and such a method requires analysis and sampling by the main CPU or detects ambient light in the front of the devices when the rear camera is in use.

SUMMARY OF EMBODIMENTS

Embodiments of the present disclosure describe an image captured device configured to modify a rolling shutter exposure window based on analysis of a signal from a semiconductor light source that is configured to operate alternatively in an illumination mode as a light source and in a sensor mode as an ambient light sensor to generate the signal.

The device includes an exposure window control component that determines, based on the signal from the semiconductor light source, a frequency of the ambient light and instructs modification of an initial exposure window, based on the period of the frequency, in embodiments. The initial exposure window may have been determined based on criteria other than the frequency of the ambient light, for example, a user-configurable setting, default duration or data from a sensor. In some embodiments the modification may cause the duration of the exposure window to be an integer multiple of the period of the frequency.

The modification of the exposure window may avoid image capture artifacts due to a flickering of the ambient light being out of sync (e.g., not an integer multiple) with the duration of the exposure window, in embodiments.

When the semiconductor light source is in the illumination mode (e.g., ready to illuminate the field of view of an image sensor when image data is captured), the device may capture of the image data without modifying the initial rolling shutter exposure window, in embodiments.

Figure 1:
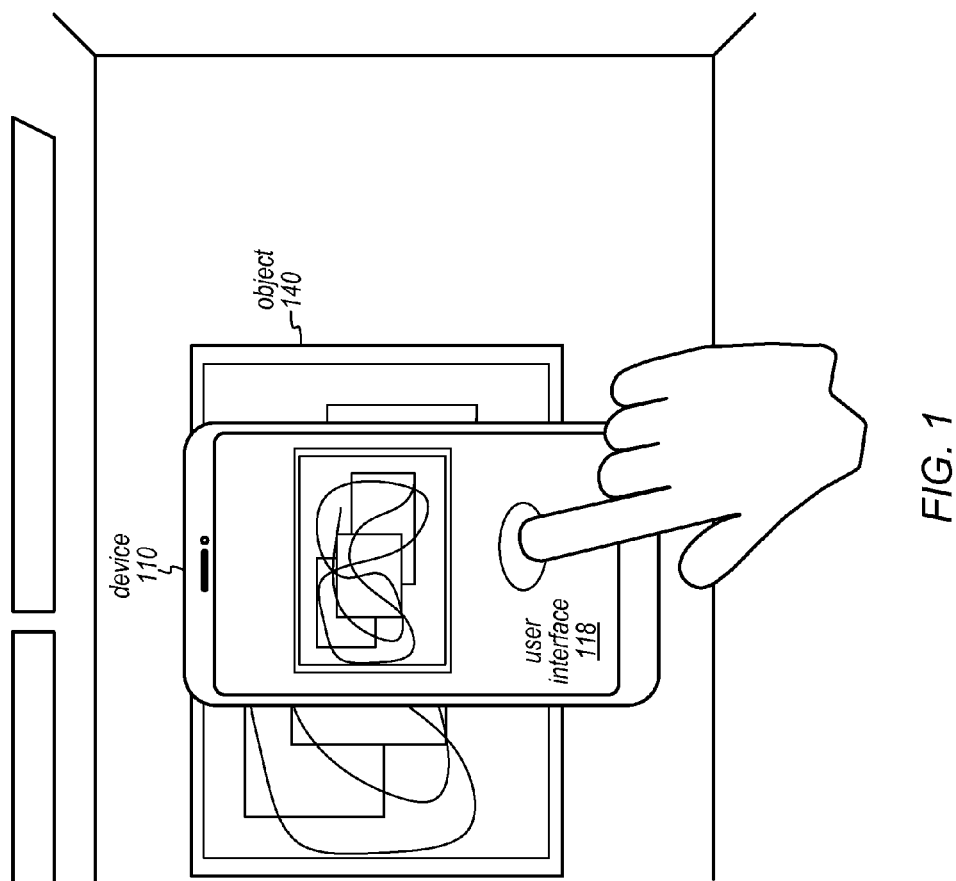
FIGS. 1 and 1A illustrate an image capture device functioning in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g. a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a device, system and method for determining an adjustment of a rolling shutter exposure window based on a period of frequency of the ambient light are disclosed. In embodiments, by utilizing a light source (e.g., a strobe LED) as an input sensor, a signal can be generated that provides the frequency of the ambient light. Sensor exposure limits can be adjusted, based on the signal, so that undesirable artifacts (e.g., "beat" patterns) are eliminated during the image capture process, in embodiments. In some embodiments, a device or system may be configured with a multi-modal semiconductor-based device that is adapted to operate in various modes. For example, the multi-modal semiconductor-based device may be configured to act as a sensor that receives ambient light and produces a signal indicating one or more characteristics of the ambient light. The same multi-modal semiconductor-based device may also be configured to provide other functionality in addition to the ambient light-sensing functionality. For example, the same multi-modal semiconductor-based device may also be configured to produce light (e.g., as a camera flash) or sense other characteristics of the ambient light (e.g., an ambient light sensor) or the like.

Ambient light may exhibit characteristics that affect a captured image of a scene, causing various artifacts to appear in the image that were not readily apparent to the naked eye at the time of image capture. Some ambient light may be of a frequency that adversely affects the image quality causing bands of lightness or darkness in the captured image, for example. Most devices do not have a sensor that is configured to determine the frequency of the ambient light in the field of view of the image sensor. This means that most devices are incapable of determining the frequency of the ambient light in the field of view. Some of the devices that are capable of preventing the artifacts associated with flickering ambient light rely upon capturing a preliminary image, analyzing that image to determine a remediation, and then applying the remediation on a subsequent image. Thus, a user is required to capture a preliminary image before capturing the desired image. Such a scheme is inconvenient at best, may require user knowledge of the scheme and can prevent spontaneous capture of images without artifacts altogether.

In some embodiments, the systems and methods described herein may enable an image capture device (e.g., a camera, a phone, a video camera, a laptop, a pad or some other camera-equipped device) to proactively determine that characteristics of the ambient light may cause artifacts in a to-be-captured image, and to make adjustments to the image capture process to prevent those artifacts from appearing in the captured image.

Figure 6:
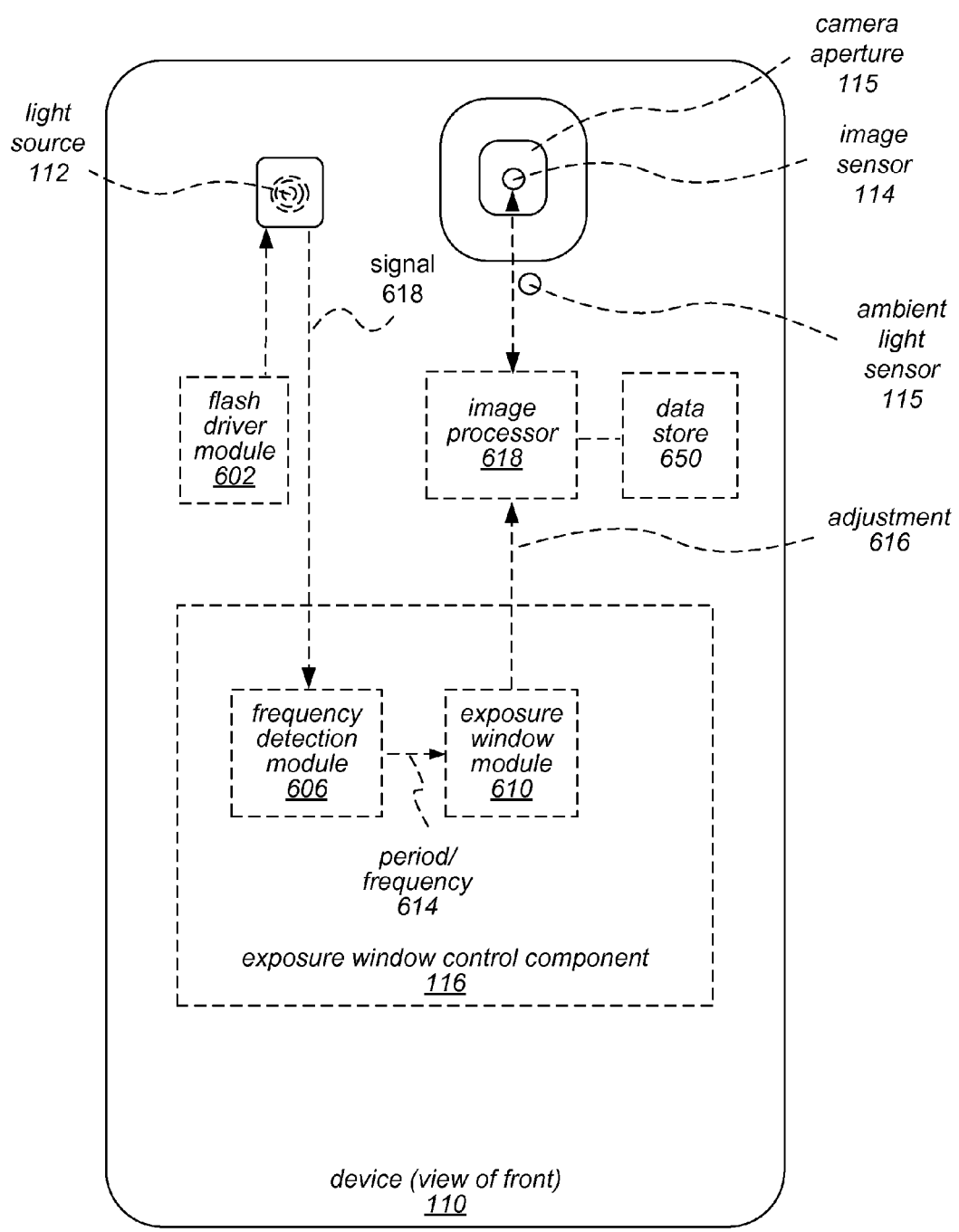
FIG. 6 illustrates an image capture device with an exposure window control component, in accordance with some embodiments.

The processes involved with determining the characteristics of ambient light and adjusting the image capture process based on the characteristic of ambient light may be performed by various components of an image capture device. As illustrated in FIG. 6 and described below, an image capture device may include an image sensor for capturing images, an exposure window control component and a light source configured to operate in two alternative modes, one mode for generating light and another mode for receiving ambient light and providing a signal to the exposure window control component, in embodiments.

As explained below, artifacts in captured images can be avoided by coordinating the periodic frequency of the ambient light with the exposure timing for a rolling shutter exposure mode (e.g., with the timing associated with an exposure window of the rolling shutter exposure mode), in embodiments. For example, in some embodiments, the light source (e.g., an LED, strobe LED, or other photo diode-type device, torch, or flash) may be operated in the light receiving mode such that ambient light is received by the light source. A frequency of the ambient light may be determined from the received ambient light. For example, an analog-to-digital converter and/or fast Fourier transform(s) may be used to obtain the frequency of the ambient light received by the light source.

In some embodiments, the image capture process may be adjusted or modified to account for the frequency. As explained below, because of the timing associated with readout of the rows of an image sensor (e.g., a CMOS imager being read out in accordance with a rolling shutter mode) may cause the actual exposure of one row (e.g., the bottom row) to be much later in time than the exposure of another row (e.g., the first row), a frame may have the same length (e.g., time) of exposure, but the exposure of a particular row of the frame may happen at a different position in time. Furthermore, because the ambient light might be fluctuating between the different positions in time of the exposures, different rows may be exposed to different amounts of the fluctuating ambient light. Such interaction between the ambient light frequency and the exposure timing or exposure window can result in "beating" row patters (e.g., alternating bands of lightness and darkness).

In some embodiments, to avoid the beating row pattern, the exposure may be adjusted such that the exposure is in sync with the frequency or the period of the frequency. For example, an exposure window may be set to an integer multiple of the period of the ambient light frequency such that an image captured using the exposure window setting avoids the beating row pattern artifact.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

Embodiments of electronic devices, user interfaces for such devices, and associated processes for using such devices are described. In some embodiments, the device is a portable communications device, such as a mobile telephone, that also contains other functions, such as image capture, PDA and/or music player functions. Exemplary embodiments of portable devices include, without limitation, the iPhone®, iPod Touch®, and iPad® devices from Apple Inc. of Cupertino, Calif. Other portable electronic devices, such as laptops or tablet computers with or without touch-sensitive surfaces (e.g., touch screen displays and/or touch pads), may also be used. Other exemplary devices include camcorders, video cameras, digital cameras and news gathering cameras. It should also be understood that, in some embodiments, the device is not a portable communications device, but is a desktop computer with or without a touch-sensitive surface (e.g., a touch screen display and/or a touch pad). In some embodiments, the device is a gaming computer with orientation sensors (e.g., orientation sensors in a gaming controller). In some embodiments, the device is a movie camera.

In the discussion that follows, an electronic device that includes a display and a touch-sensitive surface is described. It should be understood, however, that the electronic device may include one or more other physical user-interface devices, such as a physical keyboard, a mouse and/or a joystick.

Figure 1A:
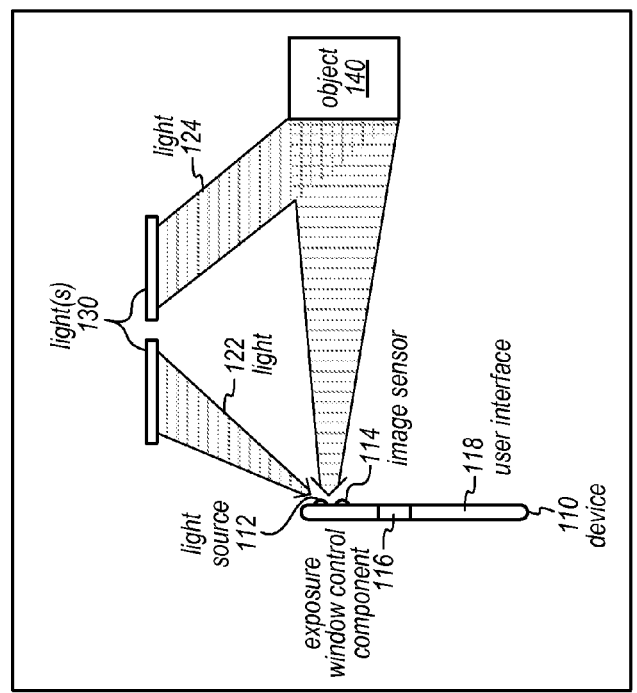

Attention is now directed toward embodiments of image and video capture and recording devices. FIGS. 1 and 1A illustrate an image capture device functioning in accordance with some embodiments. Image capture device 110 (or "the device") is illustrated with user interface 118. In some embodiments, user interface 118 may be a touch sensitive display (sometimes called a "touch screen" for convenience), and may also be known as or called a touch-sensitive display system or simply the display. Device 110 is also illustrated with light source 112, exposure window control component 116, and image sensor 114. In embodiments, device 110 may include a transmission channel (which may include RF circuitry). These components may communicate over one or more communication buses or signal lines (illustrated as communication buses or signal lines 1003 in FIG. 11).

FIG. 1 illustrates an example embodiment of an image capture device 110 for capturing images or video frames, according to some embodiments. Device 110 is illustrated in a room with light(s) 130 and object 140. FIG. 1 illustrates that the device 110 is displaying an image of object 140 via the user interface 118 and that the user is instructing (by touching the screen portion of the user interface 118) the image to be captured by the device 110. The object 140 may be an object (e.g., artwork) that is illuminated by the ambient light in the room. The ambient light is provided by light(s) 130, in embodiments. The light(s) 130 are powered by bulbs such as fluorescent light bulbs that oscillate between a positive and a negative state that causes the light from the light(s) 130 to "flicker" on and off at a frequency (e.g., flicker at 120 Hz frequency for a power source of 60 Hz AC), in the illustrated embodiment.

FIG. 1A illustrates an example image display or video player device 110 receiving ambient light at a frequency. In the illustrated embodiment, some of the ambient light (e.g., light 124) is reflected off the object 140 to the image sensor and/or light source while other ambient light (e.g., light 122) is received by the light source and image sensor directly from the light(s) 130. In either case, image sensor 114 and/or light source 112 receive ambient light with a frequency defined by the light(s) 130. In some embodiments, the ambient light may include light from other sources and at other frequencies. The distance that various portions of the light travels between different light(s) or as the light bounces off object 140 or off the walls of the room may cause the frequency of the light to shift with respect to other portions of the light, in embodiments.

For devices (e.g., device 110), including devices which include one or more miniature cameras, a lighting source, also referred to herein as a light source 112, may be included which illuminates at least a portion of a scene located within a field of view of the camera (a camera is also referred to herein as a "camera device", "camera module", etc. The field of view of a camera may be referred to herein as a "camera field of view". Such cameras and lighting sources can be included in a larger electronic device, including a mobile electronic device, which can include a mobile telephone, smartphone, notebook, etc.

The lighting source, which can include a "flash" module, "strobe" module, etc., can emit a light beam which illuminates a space external to the lighting source and can include the camera field of view, thereby illuminating subjects within the camera field of view for images of said subjects captured by the camera.

In some cases, the lighting source included in a device includes a light source which includes a light emitting diode (LED). The lighting source can include a collimator, which can include a reflective device including a parabolic mirror, a refractive device including an optical lens, some combination thereof, etc. The collimator can reduce the beam divergence ("focus") of at least a portion of the light beam emitted by the light source and direct the collimated light beam outwards from the lighting source.

Lighting sources included in small devices can generate a light beam with a static collimation capability, such that the divergence ("beam angle") and direction of the collimated light beam is static. Such a light beam, when used as for "flash" or "strobe" illumination of a scene, can flood a camera field of view with light. In some embodiments, a separate ambient light detector may be incorporated into the device. A photodiode may be incorporated into an image sensor to detect flicker, in embodiments.

In some embodiments, device 110 may support functionality for capturing images and/or video frames with image sensor 114 as well as displaying images or playing videos on user interface 118. In some embodiments, FIG. 1 illustrates one of a plurality of similar devices that capture and share images or video among one another, for example via transmission channel 150. In various embodiments, a device such as the one illustrated in FIG. 1 may capture and record an image or video and send the image or video to another device similar to the one illustrated in FIG. 1 and the similar device may display or play the image or video captured by the other device.

It should be appreciated that device 110 is only one example of a portable video capture and recording device, and that device 110 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits (ASIC).

In embodiments, user interface 118 includes a display that provides an input interface and an output interface between the device and a user. User interface 118 displays visual output to the user, in the illustrated embodiment. The visual output may include graphics, text, icons, video, and any combination thereof (collectively termed "graphics").

Device 110 may also include one or more image sensor(s). Illustrated image sensor 114 may also be known as or called an optical sensor or camera sensor. Image sensor (one of camera sensor(s) 1264 in FIG. 12) may include charge-coupled device (CCD), complementary metal-oxide semiconductor (CMOS) phototransistors or other photo sensors known in the art. Image sensor 114 receives light from the environment, projected through one or more lenses, and converts the light to data representing an image. Image sensor 114 may capture still images or video. In the illustrated embodiments, an image sensor is located on the back of device 110, opposite user interface 118 on the front of the device, so that the user interface may be used as a viewfinder for still and/or video image acquisition. In some embodiments, another optical sensor is located on the front of the device so that the user's image may be obtained for video-conferencing while the user views the other video conference participants on the touch screen display.

Figure 2A:
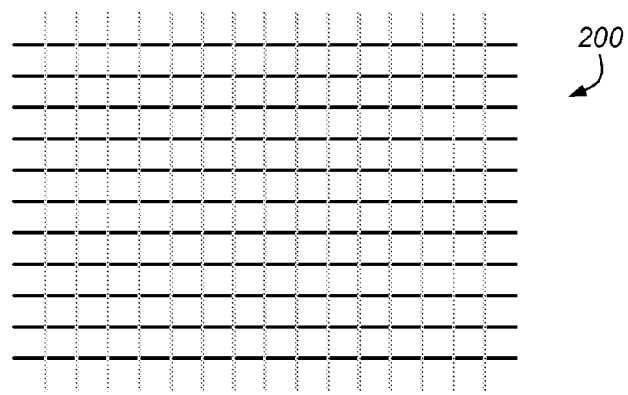
FIGS. 2A and 2B illustrate an arrangement of pixels in an image sensor, and a process for reading out frames of video images, respectively, in accordance with some embodiments.
Figure 2B:
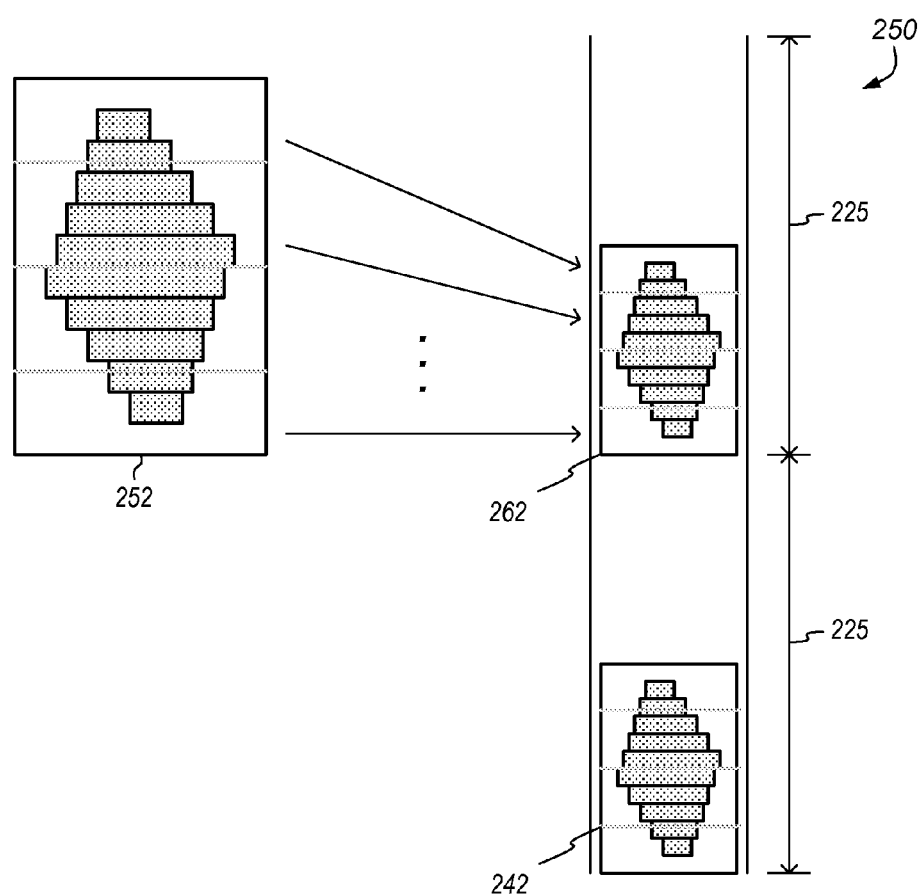

FIGS. 2A and 2B illustrate an arrangement of pixels in an image sensor, and a process for reading out frames of video images, respectively, in accordance with some embodiments. FIG. 2A illustrates an embodiment of an image sensor (e.g., a CMOS image sensor) with pixels arranged in rows. In a rolling shutter mode, each row of pixels may be read out from the sensor one after another. The entire sensor may be read out for each frame, and the read-out process may be time-limited due to a frame rate, in some embodiments. FIG. 2B illustrates that each row of the captured image 252 on the image sensor is read out sequentially to create a frame (e.g., captured image 252 is illustrated a as being read out during a length of time 225 to create frame 262 and a prior captured image was read out during a same length of time 225 to create frame 242). In one example, the length of time 225 allocated to each frames may be about 33 milliseconds (e.g., a frame rate of 30 frames per second means that the sensor must be read out in about 33 milliseconds or less, which in the illustrated example, takes about half the allocated time, or about 12 milliseconds).

In embodiments, the row that is being read out is put in a "reset" state until it is time to begin exposure. In some imagers (e.g., CMOS imagers) each row can be adjusted for the amount of time it is exposed by adjusting the time from when the row is released from a "reset" state until the row is read out. Each row is exposed the same amount of time and read out in the same manner, until all the rows of the imager are read out, in embodiments.

Note that according to this methodology, the actual exposure of the bottom row is later than the exposure of the first row. Thus, while the exposure for different rows is for the same amount or length of time, the position in time is different for different rows. Such a mode of operation may be referred to as a rolling shutter exposure mode. In some embodiments, rolling shutter exposure may cause motion artifacts or cause "beating" row patterns (e.g., alternating bands of lightness and/or darkness) with some light sources (e.g., flickering light sources such as fluorescent of LED bulbs).

Figure 3:
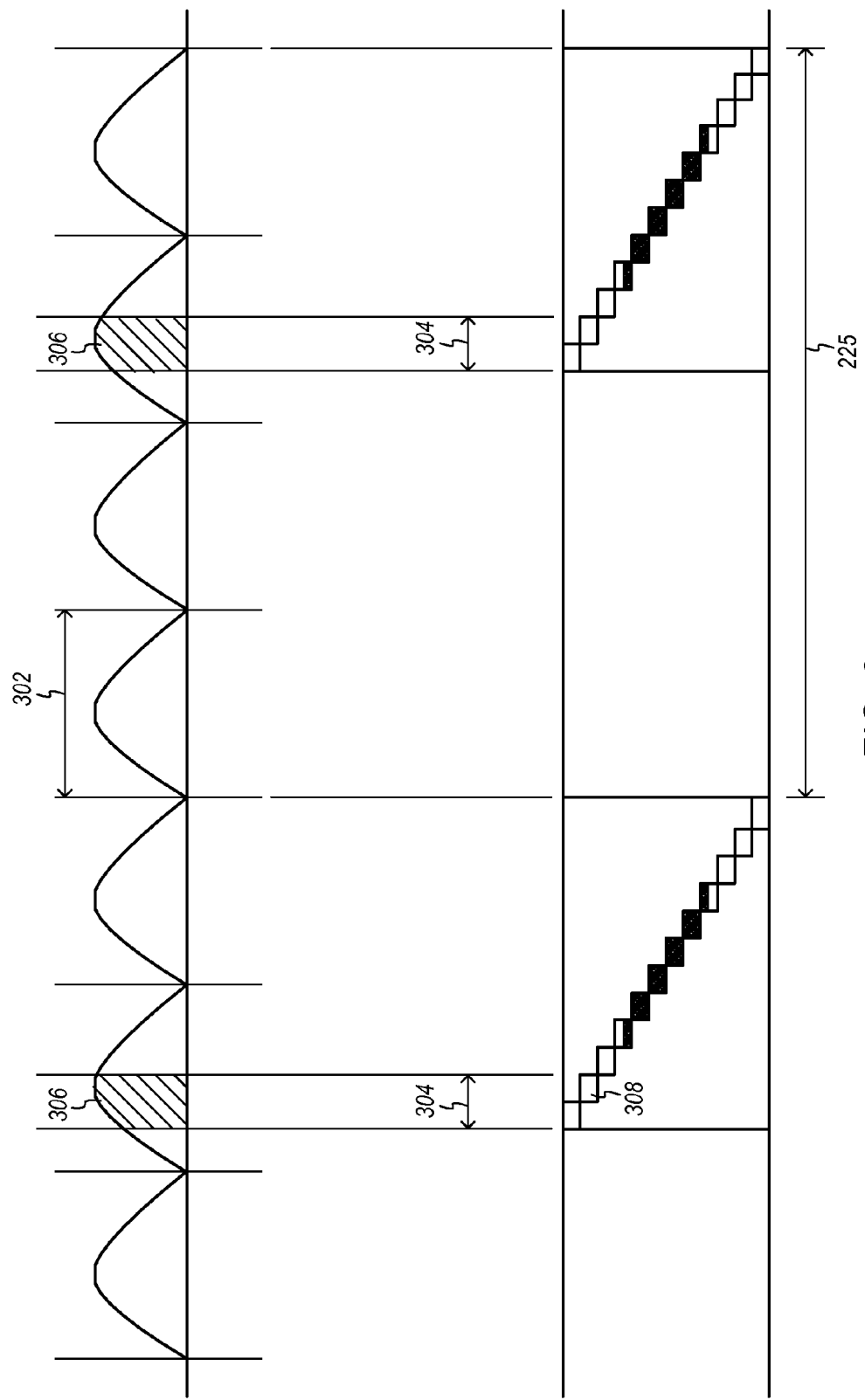
FIG. 3 illustrates an interaction between a frequency of ambient light and readout of rows of the video frames, in some embodiments.

FIG. 3 illustrates an interaction between a frequency of ambient light and readout of rows of the video frames, in some embodiments. In FIG. 3, an AC light source is illustrated across the top of the figure. For example, in an embodiment for a 120 Hz light source, the period 302 of the light source is about 8.33 milliseconds. Exposure window 304 is illustrated as well as frame rate 225 (e.g., in an embodiment where the frame rate is 30 frames per second, a frame is read out about every 33 milliseconds, as described above in regard to FIG. 2B). The lower part of FIG. 3 illustrates that the rows of the frame are read out over time in order. For example, the first box at the upper left of the stair steps of rows of corresponds to the first row of the image 252 in FIG. 2B. The top portion of FIG. 3 illustrates that photon energy is different at different times. In some embodiments, the read out of rows of the frame is performed while other rows of the frame are still exposed. Thus, the ambient lighting is changing as different rows of the same image frame are exposed, in embodiments.

Thus, FIG. 3 illustrates that although the frame was captured during a peak in the frequency of the light source, middle rows of the image area may be exposed during a trough in the period of the AC frequency. In embodiments, the exposure window may be increased towards the point where the combined exposure and readout time takes up nearly all of the time 225 allocated to the frame. However, longer exposure times may lead to overexposure or saturation in high illumination, in some embodiments, negating the benefits of the reduction in artifacts.

Figure 4:
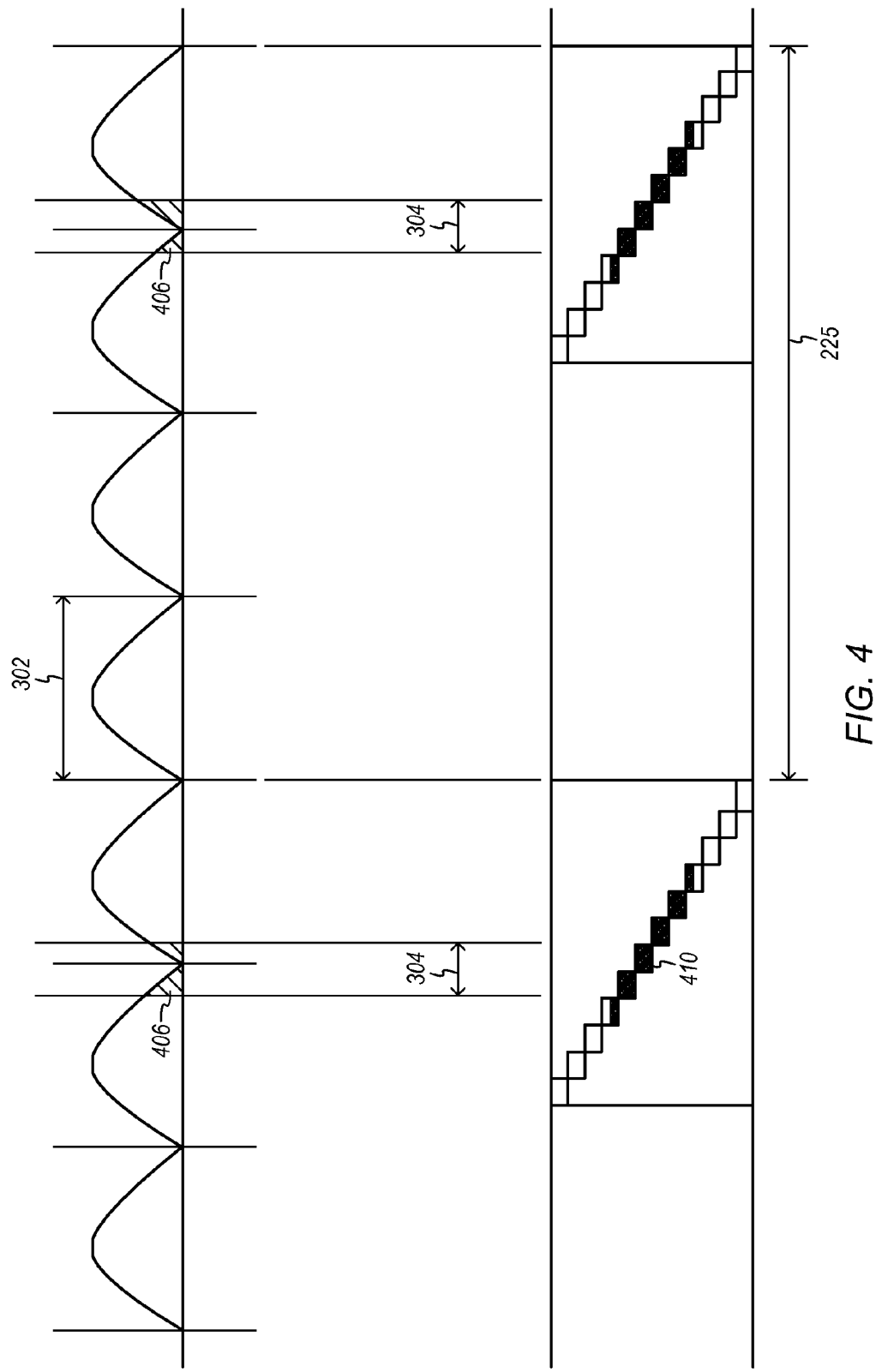
FIG. 4 illustrates that a light level for each particular row of a frame may vary with the frequency of the ambient light, in embodiments.

Note that, in some embodiments, if the exposure is shortened to less than the period of the light source frequency, the pattern of bands in the frame becomes worse. For example, in FIG. 4 the exposure window 304 is the same length of time as in FIG. 3, but the exposure is illustrated as happening later in time, during a trough 406 in the amplitude of the AC frequency. When taken together FIGS. 3 and 4 illustrate that the top rows 308 of the frame may be brighter because they are exposed during a higher amplitude or brighter portion of the AC frequency period while subsequent rows 410 of the frame may be darker because they were exposed during a lower amplitude or darker portion of the AC frequency period. This pattern of lightness and darkness may continue through the rows of the frame as the amplitude of the frequency changes during sequential exposure of the rows of the image sensor, in embodiments.

Figure 5:
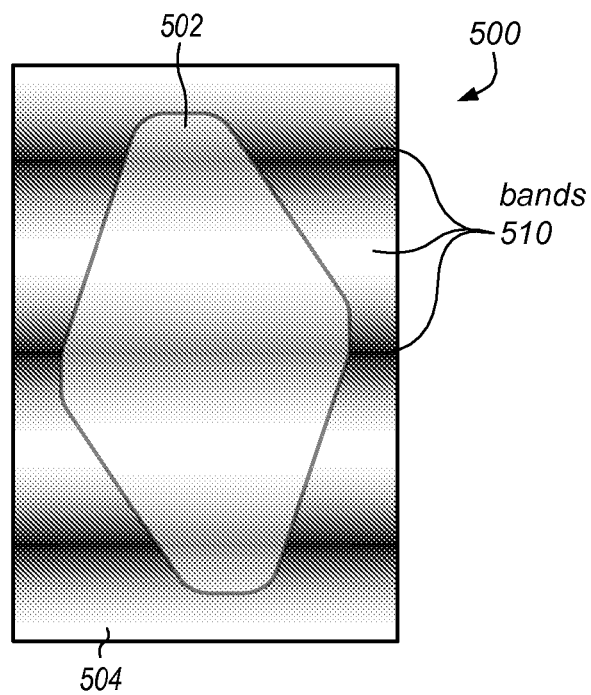
FIG. 5 illustrates that that an image captured in flickering ambient light may exhibit bands of lightness and darkness.

FIG. 5 illustrates that an image captured in flickering ambient light may exhibit bands of lightness and darkness. In FIG. 5, bands 510 of lightness and darkness are illustrated. The bands affect both the background 504 as well as the objects 502 in the image 500. Images with shorter or longer, non-integral multiple exposure time relative to the light source will show row banding, in some embodiments. High speed camera modes (e.g., for capturing slow motion scenes) exhibit banding artifacts (e.g., in certain lighting conditions, such a fluorescent lighting), in embodiments.

FIG. 6 illustrates an image capture device with exposure window control component, in accordance with some embodiments. In some embodiments, the modules of the exposure window control component may perform one or more elements of the processes illustrated in FIGS. 7 and 8 (described below). The flash driver module 602 or the image processor 618 may be configured to perform some or all of the elements, in embodiments. In some embodiments, device 110 may be configured with a camera source including an illumination source driver (e.g., strobe LED driver) or supply output from the illumination source.

In the illustrated embodiment, device 110 is configured with light source 112. As described herein, light source 112 (e.g., an LED, strobe LED, or other semiconductor-based or photo diode-type device) is configured to operation in one of at least two alternative modes. In an illumination mode, light source 112 may be configured to receive instructions from a flash driver module 602 (e.g., instructions to generate illumination). In a sensor mode, light source 112 may be configured to sense ambient light and produce a signal (e.g., signal 618) in response to the ambient light. In the illustrated embodiment, device 110 includes an ambient light sensor 115. The ambient light sensor 115 may be configured to detect the amplitude of ambient light (e.g., to control display brightness or for other purposes), in embodiments. The ambient light sensor 115 may be configured to detect the frequency of ambient light, in some embodiments. Device 1110 may be configured without ambient light sensor 115, in some embodiments.

Any of variously-configured sensor devices may be used for sensing ambient light in embodiments. In some embodiments, one or more pixels of the image sensor 114 may be configured as an ambient light sensor. Such a configuration may target a relatively small area of the overall environment, in embodiments. In some embodiments, a sensor component (e.g., light source 112) may be a semiconductor-based device. The sensor component may be coupled to a cover or lens that acts to diffuse light as light passes through the lens, in embodiments. Such a configuration may act to integrate the ambient light from a larger area of the environment, in embodiments.

Other sensors and arrangements of sensor are contemplated as well. Some devices are configured with an ambient light sensor. Some devices are configured with ambient light sensors for determining the amplitude of the light (e.g., to responsively adjust the screen brightness). For example, some devices (e.g., a smart phone) are configured with an ambient light sensor on the display side of the device. In another example, some devices (e.g., tablets) are configured with an ambient light sensor on the side opposite the display. Such a configuration may measure characteristics of the light in the room, instead of the light characteristics of the target (e.g, the target of the image sensor). In embodiments, any of various existing sensors that are configured for some other task or to provide some other functionality may be reconfigured or repurposed to also act as an ambient light sensor that provides a signal indicative of the frequency of the ambient light.

In at least the illustrated embodiment, the signal 618 may be passed to frequency detection module 606. In some embodiments, the frequency detection module 606 analyzes the signal and passes a period or frequency 614 to exposure window module 610. For example, FIG. 7, described below, illustrates components and a process for determining a frequency from ambient light that may be performed by one or more of the modules illustrated in FIG. 6. The exposure window control module may use the received period or frequency to determine an adjustment for a rolling shutter exposure window as described herein (e.g., the exposure window illustrated in FIG. 3, 4, 10 or 11). The determined adjustment 616 may be sent to the image processor 618 that may use the adjustment to modify an existing rolling shutter exposure window. The image processor may instruct the image sensor 114 to capture an image according to the modified rolling shutter exposure window and store the captured image in data store 650.

Figure 7:
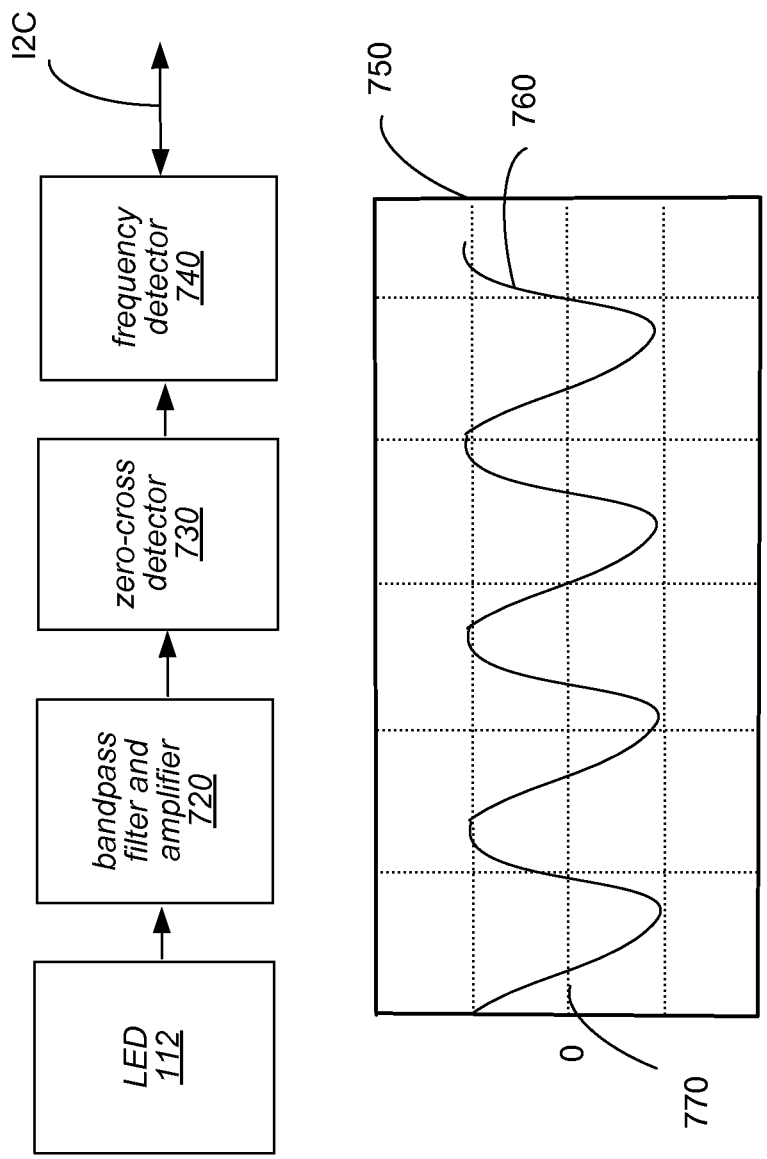
FIG. 7 illustrates components for ambient light detection using an LED strobe, in some embodiments.

FIG. 7 illustrates components for ambient light detection using an LED strobe, in some embodiments. In embodiments, various components of the device may include an analog amplifier and/or a filter breadboard with a microChip uController to act as a counter/I2C interface such that data can be sent to the data processor. In some embodiments, portions or all of such a component may be included in a flash driver (e.g., flash drive module 602) or as part of an ambient light sensor or ambient light sensor controller. In other embodiments, portions or all of such a mechanism could be integrated into the imaging sensor (e.g., imaging sensor 114). In particular, an LED strobe 112 is illustrated operating in a sensing mode such that the LED strobe 112 turns received photons from ambient into a signal that is provided to a bandpass filter and/or amplifier 720 that filters and amplifies the signal from the LED strobe. In the illustrated embodiment, the filtered and amplified signal is then passed to a zero-cross detector. The zero-cross detector outputs a signal to the frequency detector 740 each time the filtered and amplified signal has no voltage, in embodiments.

The frequency detector counts the number of times a signal is received from the zero-cross detector 730 and determines the frequency of the filtered and amplified signal based on the number of times a signal is received over a period of time. The graph 750 illustrates zero crossing in a waveform 760 representing voltage vs. time. Horizontal line 770 defines the zero crossing, in some embodiments. The illustrated waveform may differ from waveforms in other embodiments.

Figure 8:
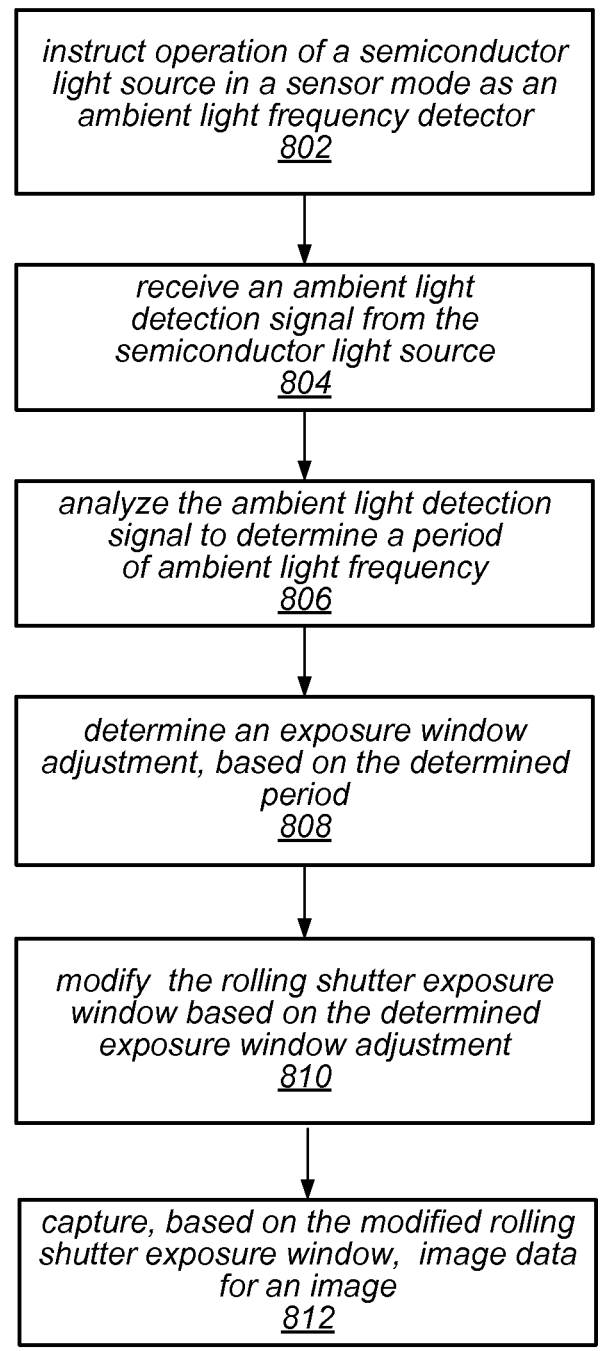
FIG. 8 illustrates a process for modifying an exposure window of a rolling shutter exposure, according to some embodiments.

FIG. 8 illustrates a process for modifying an exposure window of a rolling shutter exposure, according to some embodiments. Various elements of the process illustrated in FIG. 8 may be performed by various components of the device 110. For example, the modules of the exposure window control component 116 may perform one or more of the elements of the illustrated process. In some embodiments, the elements of the illustrated process are performed by a device configured with an LED light source that is configured to operate in a light source or illumination mode and/or a sensor mode as an ambient light frequency detector.

As illustrated in FIG. 8, in one or more embodiments, a semiconductor light source is operated in a sensor mode as an ambient light frequency detector (block 802) and an ambient light detection signal is received from the semiconductor light source (block 804). For example, a flash LED unit of device 110 may be configured to receive ambient light and output a signal indicating characteristic(s) of the ambient light to a receiver module (e.g., signal receive module 606).

The ambient light detection signal may be analyzed to determine a period of ambient light frequency (block 806). For example, the signal receive module 606 or the exposure window module 610 may use a signal processing block to determine characteristic(s) of the ambient light (e.g., using an analog-to-digital converter and a fast Fourier transform to determine a frequency).

Block 808 illustrates that an exposure window adjustment is determined for a rolling shutter exposure window of the image capture device. For example, exposure window module 610 or some other module, such as camera control module 618 of device 110 may receive an indication of an initial exposure window, based on a user configuration or based on the brightness of the ambient light, for example. The exposure window control module 610 may determine an adjustment or modification, based on the frequency or period of the frequency of the ambient light such that the exposure time is an integer multiple of the ambient light period. In some embodiments, the exposure time may be set such that the period of the exposure is greater than or equal to the period of the ambient light frequency.

The rolling shutter exposure window may be modified based on the adjustment (block 810). For example, the exposure window module 610 or the camera control module 618 may modify the initial exposure window up or down to the nearest integer multiple of the ambient light period, based on the adjustment 616. Image data for an image is captured, based on the modified rolling shutter exposure window (block 812). for example, image processor 618 exposes and reads out the rows of image sensor 114 as controlled by camera control module 618 and in accordance with the adjustment 616 provided by exposure window module 610 to the camera control module 618.

Figure 9:
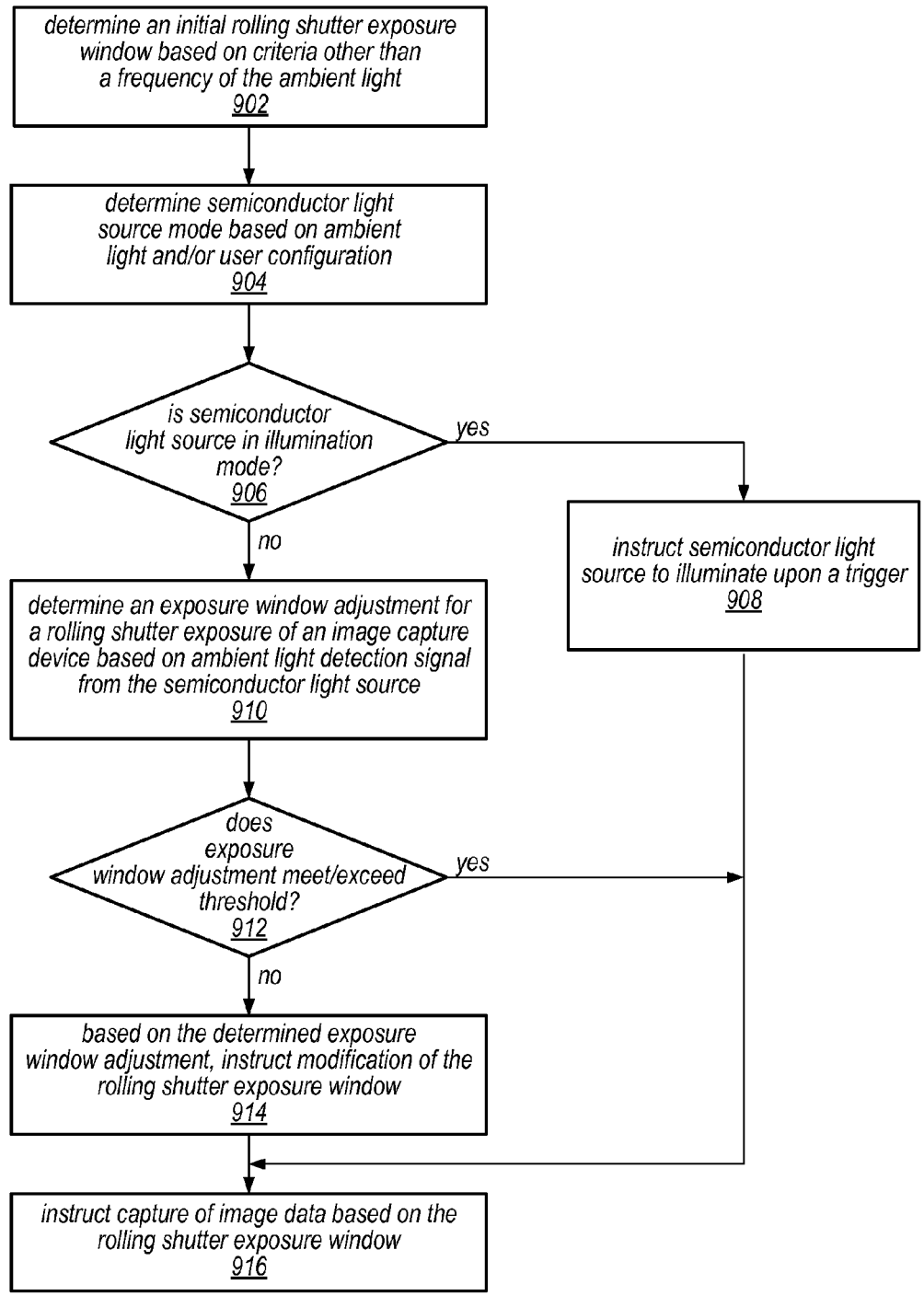
FIG. 9 illustrates a process for modifying an exposure window of a rolling shutter exposure, according to some embodiments.

FIG. 9 illustrates a process for modifying an exposure window of a rolling shutter exposure, according to some embodiments. In FIG. 9, a number of decision points are illustrated that may cause the adjustments to the exposure window, described herein, to be avoided, such as when the light source is in illumination mode, or when an increase in the exposure time would cause overexposure or saturation.

In some embodiments, an initial rolling shutter exposure window may be determined based on criteria other than a frequency of the ambient light (block 902). For example, an initial rolling shutter exposure window may be determined based on the brightness of the ambient light (e.g., automatically determined by one or more light sensors), or based on user configured settings or modes (e.g., a user configured indoor mode or a user configured high-speed mode).

Block 904 illustrates that a mode of the semiconductor light source is determined, based on ambient light and/or user configuration, in embodiments. For example, if the ambient light is bright, the semiconductor light source 112 may change mode from illumination mode to a sensor mode as an ambient light frequency detector to receive an ambient light detection signal. In another example, if the device senses a low-light environment or the device is configured by the user to be in an illumination mode (e.g., a user-configurable night-time mode) the semiconductor light source 112 may be configured in an illumination mode.

Block 906 illustrates a decision point. If the semiconductor light source is in the illumination mode (block 906, yes) then the semiconductor light source is instructed to illuminate upon a trigger. For example, an LED flash may be instructed to light up during an image capture process. If the semiconductor light source is in the sensor mode (block 906, no) then an exposure window adjustment for a rolling shutter exposure of an image capture device is determined, based on ambient light detection signal from the semiconductor light source (block 910). For example, FIG. 9 illustrates at least part of an example process for determining the exposure window adjustment.

Block 912 illustrates another decision point where it is determined whether the exposure window adjustment meets and/or exceeds a threshold. For example, some adjustments that increase the length of time for the exposure window may cause overexposure of the image. In such cases, it may be preferred to not modify the exposure window (912, yes) and deal with the artifacts (e.g., in post-processing) instead of the overexposure or saturation. In some embodiments, the threshold may be based on a default, a user-configurable setting or dynamic analysis of the field of view or ambient light (e.g., by one or more camera sensors and corresponding modules). However, if the threshold is not exceeded, (912, no) modification of the rolling shutter exposure window is instructed, based on the determined window adjustment, in embodiments. For example, the initial rolling shutter exposure window may be modified based on the determined window adjustment, or the initial rolling shutter exposure window may be modified based on some combination of the determined window adjustment and other adjustments (e.g., adjustments based on changes to configuration settings or adjustments based on analysis of the device environment such as ambient brightness).

Capture of image data, based on the rolling shutter exposure window is instructed (block 916), in embodiments. For example, a user may interact with the user interface 118 of device 110 instructing the device to capture an image of the object 140 and the camera control module 618 may instruct the image processor 620 to operate the rolling shutter exposure window based on the modified rolling shutter exposure window such that one or more images 620 are captured.

Figure 10:
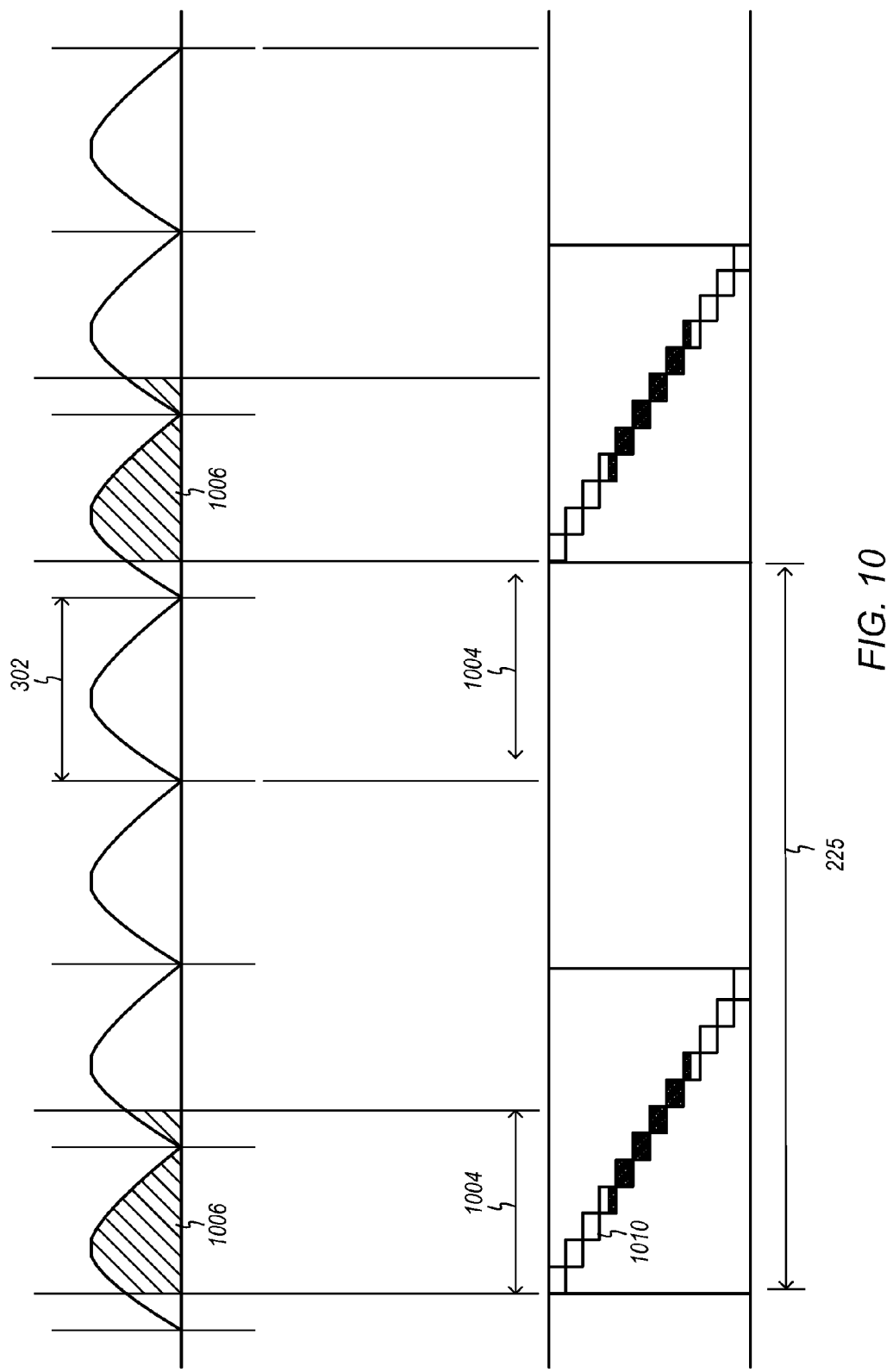
FIG. 10 illustrates that an exposure window can be adjusted to correspond with the frequency of ambient lighting, in some embodiments.

FIG. 10 illustrates that an exposure window can be adjusted to correspond with the frequency of ambient lighting, in some embodiments. In FIG. 10, length of time 225 to create frame (e.g., 33 milliseconds) and the period 302 (e.g., about 8.33 milliseconds) of the light source remain the same as in FIGS. 3 and 4. However, the length of the exposure 1004 has been modified to be an integer multiple of the period (e.g., the exposure window has been set to a duration of 8.33 milliseconds as well). Such a modification (matching the periodic illumination of the flickering light source to the duration of the exposure window) causes the same amount of luminous energy to be present in all exposed rows, regardless of timing delay during readout.

Figure 11:
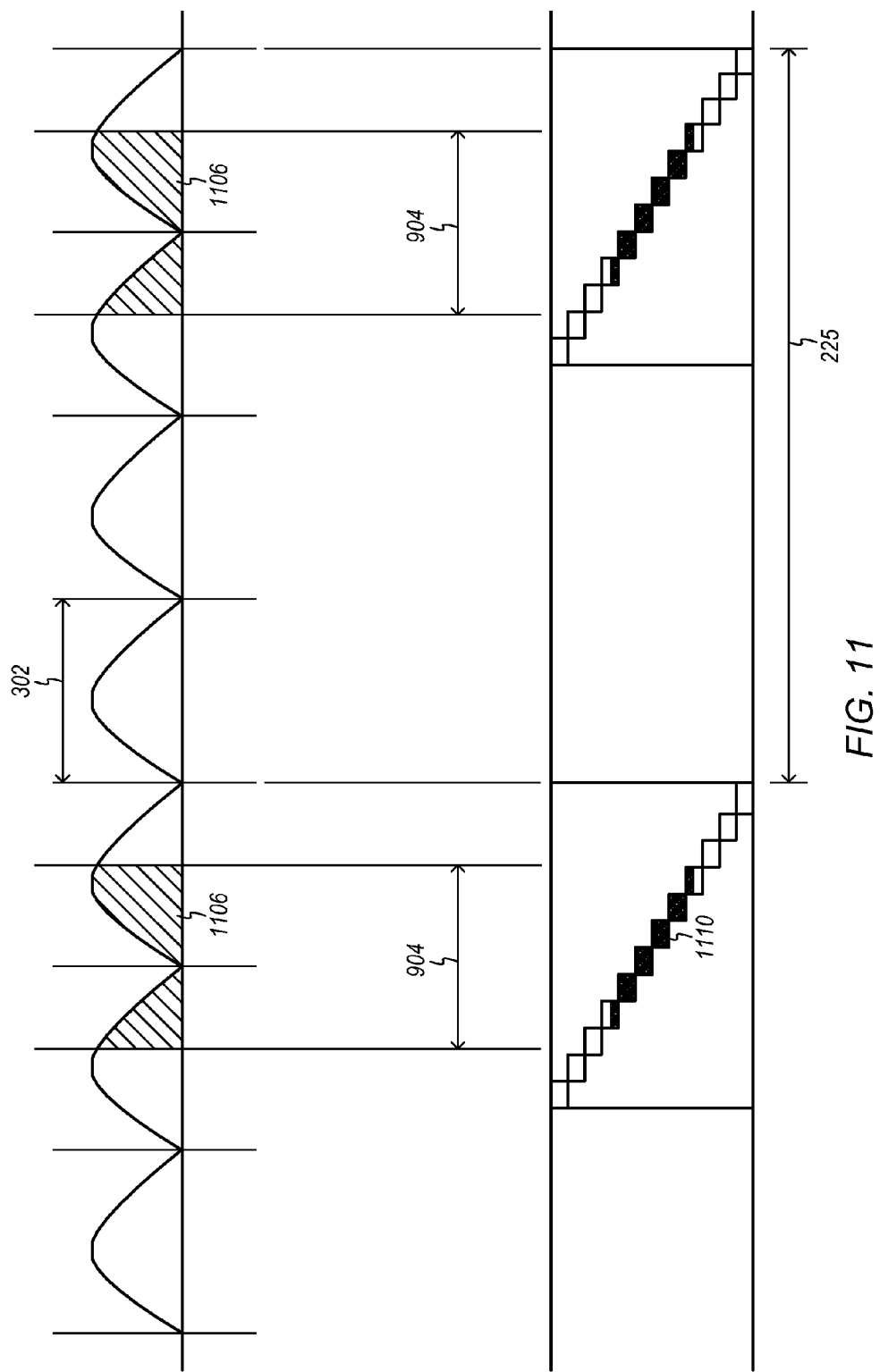
FIG. 11 illustrates that an exposure window can be adjusted to correspond with the frequency of ambient lighting, in some embodiments.

Similarly, FIG. 11 further illustrates that an exposure window can be adjusted to correspond with the frequency of ambient lighting, in some embodiments. Although the portion 1106 of the period 302 has changed in FIG. 11, the duration of the exposure window still matches (e.g., is an integer multiple) of the period 302 and as such, the same amount of luminous energy is present in all exposed lines, regardless of timing delay in readout. Even though the portion 1106 of the period 302 has moved along the signal to include a different portion of the signal, the same amount of luminous energy is present in portion 1106 as in portion 1006. Thus, the respective rows (1010, 1110) that are exposed during the respective portions (1006, 1106) of the frequency are exposed to the same amount of luminous energy. Such correspondence prevents artifacts (e.g., motion artifacts, or "beating" row patterns illustrated in FIG. 5).

Figure 12:
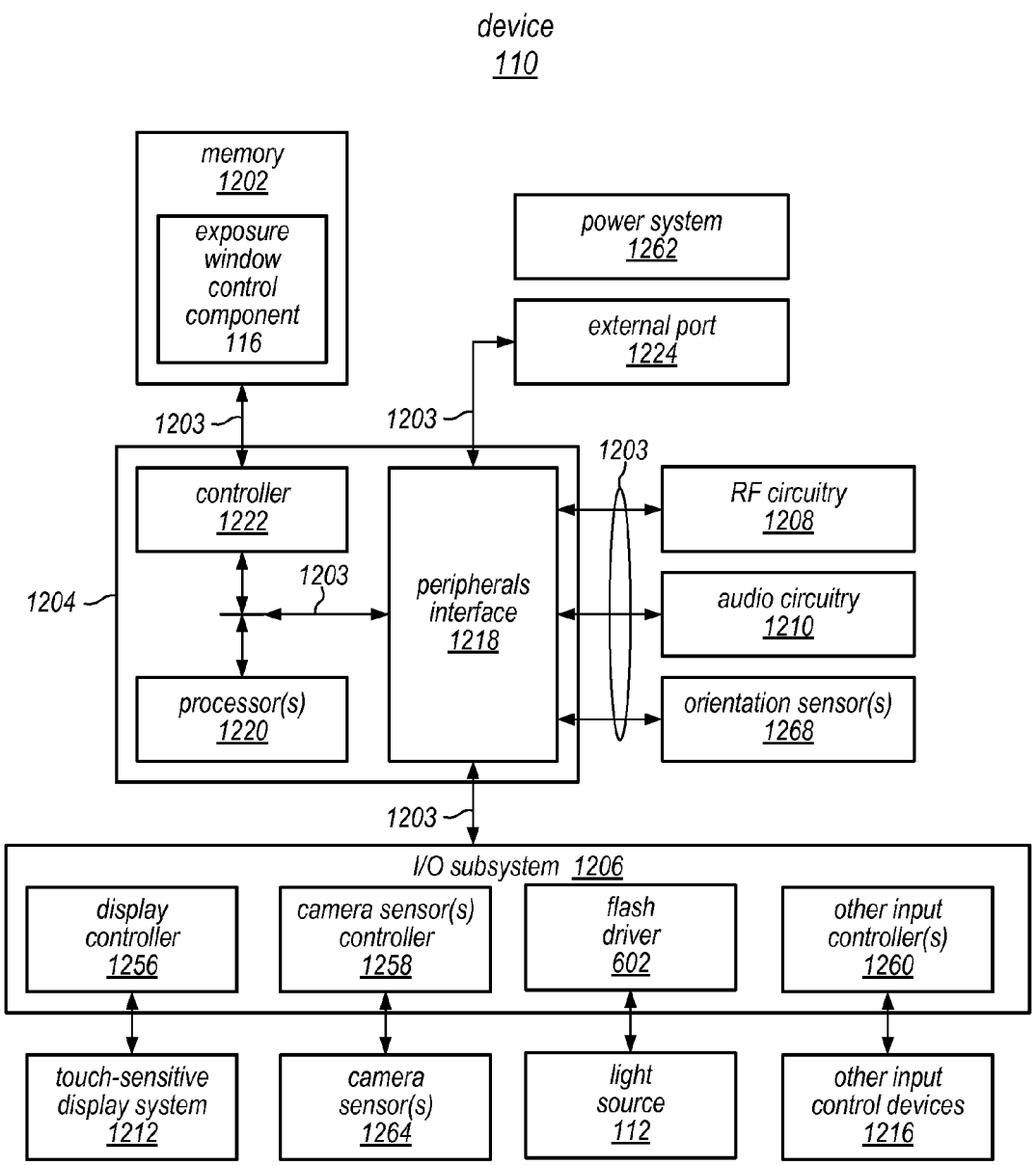
FIG. 12 illustrates a system diagram of an image capture device, in accordance with some embodiments.

FIG. 12 illustrates a system diagram of an image capture device, in accordance with some embodiments. In FIG. 12, device 110 is illustrated with one or more camera sensors 1264 (e.g., image sensor 114), camera sensor controllers 1258 (e.g., image processor 618), flash driver 602, and light source 112. These components may communicate over one or more communication buses or signal lines 1203. It should be appreciated that device 110 is only one example of a portable video capture and recording device, and that device 110 may have more or fewer components than shown, may combine two or more components, or may have a different configuration or arrangement of the components. The various components shown in FIG. 12 may be implemented in hardware, software, or a combination of hardware and software, including one or more signal processing and/or application specific integrated circuits.

Memory 1202 may include high-speed random access memory and may also include non-volatile memory, such as one or more magnetic disk storage devices, flash memory devices, or other non-volatile solid-state memory devices. Access to memory 1202 by other components of device 110, such as CPU/processor(s) 1220 and the peripherals interface 1218, may be controlled by memory controller 1222.

Peripherals interface 1218 can be used to couple input and output peripherals of the device to CPU 1220 and memory 1202. The one or more processor(s) 1220 run or execute various software programs and/or sets of instructions stored in memory 1202 to perform various functions for device 110 and to process data.

In some embodiments, peripherals interface 1218, CPU 1220, and memory controller 1222 may be implemented on a single chip, such as chip 1204. In some other embodiments, they may be implemented on separate chips. RF (radio frequency) circuitry 1208 receives and sends RF signals, also called electromagnetic signals. RF circuitry 1208 converts electrical signals to/from electromagnetic signals and communicates with communications networks and other communications devices via the electromagnetic signals. RF circuitry 1208 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1208 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 1206 couples input/output peripherals on device 110, such as touch screen 1212 (e.g., part of user interface 118) and other input control devices 1216, to peripherals interface 1218. I/O subsystem 1206 may include display controller 1256 and one or more input controllers 1260 for other input or control devices. The one or more input controllers 1260 receive/send electrical signals from/to other input or control devices 1216. The other input control devices 1216 may include physical buttons (e.g., push buttons, rocker buttons, etc.), dials, slider switches, joysticks, click wheels, and so forth. In some alternate embodiments, input controller(s) 1260 may be coupled to any (or none) of the following: a keyboard, infrared port, USB port, and a pointer device such as a mouse.

Touch-sensitive display 1212 (e.g., part of user interface 118) provides an input interface and an output interface between the device and a user. Display controller 1256 receives and/or sends electrical signals from/to touch screen 1212. Touch screen 1212 displays visual output to the user. The visual output may include graphics, text, icons, video, and any combination thereof (collectively termed "graphics"). In some embodiments, some or all of the visual output may correspond to user-interface objects.

Device 110 also includes power system 1262 for powering the various components. Power system 1262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 110 may also include one or more optical sensors 1264 (e.g., image sensor 114). Optical sensors 1264 may include charge-coupled device (CCD) or complementary metal oxide semiconductor (CMOS) phototransistors. Optical sensors 1264 receives light from the environment, projected through one or more lens, and converts the light to data representing an image. Optical sensors 1264 may capture still images or video. In some embodiments, an optical sensor is located on the back of device 110, opposite touch screen display 1212 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 110 includes one or more orientation sensors 1268. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 110. In some embodiments, the one or more orientation sensors include any combination of orientation/rotation sensors. In some embodiments, the one or more orientation sensors 1268 may be coupled to an input controller 1260 in I/O subsystem 1206. In some embodiments, information is displayed on the touch screen display in a portrait view or a landscape view based on an analysis of data received from the one or more orientation sensors.

In some embodiments, the software components stored in memory 1202 include an exposure window control component 116. The software components stored in memory 1202 may also include an operating system, communication module (or set of instructions), contact/motion module (or set of instructions), graphics module (or set of instructions), text input module (or set of instructions) Global Positioning System (GPS) module (or set of instructions), and applications (or sets of instructions) (all not illustrated).

In conjunction with touch screen 1212, display controller 1256, camera sensor(s) 1264, camera sensor controller 1258 and a camera module (not illustrated) may include executable instructions to capture still images or video (including a video stream) and store them into memory 1202, modify characteristics of a still image or video, or delete a still image or video from memory 1202.

In conjunction with touch screen 1212, display controller 1256 and a camera module, an image management module (not illustrated) may include executable instructions to arrange, modify (e.g., edit), or otherwise manipulate, label, delete, present (e.g., in a digital slide show or album), and store still and/or video images.

In conjunction with touch screen 1212, display system controller 1256, a graphics module, audio circuitry, speaker and RF circuitry 1208, a media player module not illustrated) may include executable instructions that allow the user to download and play back recorded media and other sound files stored in one or more file formats, such as MP3 or AAC files, and executable instructions to display, present or otherwise play back videos (e.g., on touch screen 1212 or on an external, connected display via external port 1224).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1202 may store a subset of the modules and data structures identified above. Furthermore, memory 1202 may store additional modules and data structures not described above.

In some embodiments, device 110 is a device where operation of a predefined set of functions on the device is performed exclusively through a touch screen and/or a touchpad. By using a touch screen and/or a touchpad as the primary input control device for operation of device 110, the number of physical input control devices (such as push buttons, dials, and the like) on device 110 may be reduced.

The predefined set of functions that may be performed exclusively through a touch screen and/or a touchpad include navigation between user interfaces. In some embodiments, the touchpad, when touched by the user, navigates device 110 to a main, home, or root menu from any user interface that may be displayed on device 110. In such embodiments, the touchpad may be referred to as a "menu button." In some other embodiments, the menu button may be a physical push button or other physical input control device instead of a touchpad.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g. as instructions or structured data) on a computer-accessible medium or a portable article to be read by an appropriate drive, various examples of which are described above. In some embodiments, instructions stored on a computer-accessible medium separate from device 110 may be transmitted to device 110 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A device, comprising:
   an image sensor configured to capture image data for an image in the image sensor's field of view, wherein the image data is captured based at least in part on rolling shutter exposure;
   a semiconductor component configured to operate in a plurality of modes, each mode associated with particular functionality; and
   an exposure window control component configured to:
      determine a frequency of an ambient light within at least a portion of the image sensor's field of view based at least in part on a signal from the semiconductor component that provides an indication of the frequency of the ambient light, and
      instruct modification of an exposure window for capturing portions of the image data according to the rolling shutter exposure, the modification of the exposure window based at least in part on the determined frequency of the ambient light, wherein determination of the modification avoids an increase in the exposure window that would cause overexposure; and
      instruct capture of the image data based on the modified exposure window.

2. The device of claim 1, wherein the plurality of modes of the semiconductor component comprise:
   an illumination mode, wherein when the semiconductor component is in the illumination mode, the semiconductor component is driven by a signal to generate light that illuminates an illumination area within the image sensor's field of view, and
   a sensor mode, wherein when the semiconductor component is in the sensor mode, the semiconductor component generates the signal based on ambient light received by the semiconductor component.

3. The device of claim 2, wherein for subsequent images, and when the semiconductor component is in the illumination mode, the device is configured to instruct capture of the image data without modifying the respective rolling shutter exposure windows.

4. The device of claim 1, wherein the exposure window control module is further configured to instruct adjustment of the exposure window based at least in part on criteria in addition to the determined frequency of the ambient light.

5. The device of claim 4, wherein the exposure window control module is configured to perform the modification subsequent to the adjustment of the exposure window, and wherein the modification comprises rounding the exposure window to the nearest integer multiple of a period of the determined frequency.

6. A method, comprising:
   performing, by an image capture device:
      instructing a semiconductor component to operate in a sensor mode as an ambient light sensor to generate a signal indicative of ambient light within at least a portion of the image sensor's field of view;
      analyzing, by an exposure window control component, the signal from the semiconductor component to determine a period of the frequency of the ambient light indicated by the signal;
      determining an adjustment for a rolling shutter exposure window for capturing an image, the adjustment for the rolling shutter exposure window based at least in part on the determined period of the frequency of the ambient light indicted by the signal, wherein determining the adjustment includes avoiding an adjustment that would cause overexposure of the image;
      modifying the rolling shutter exposure window based at least in part on the rolling shutter exposure window adjustment; and
      capturing the image in accordance with the modified rolling shutter exposure window.

7. The method of claim 6, wherein said modifying the rolling shutter exposure window based at least in part on the determined rolling shutter exposure window adjustment comprises modifying the exposure window to avoid image capture artifacts due to the rolling shutter exposure window not being an integer multiple of the ambient light period.

8. The method of claim 6, further comprising:
   for a subsequent image capture:
      determining another rolling shutter exposure window based at least in part on criteria other than the determined frequency of the ambient light for the respective image;
      determining whether the semiconductor device component is in an illumination mode for the respective image; and
      when the semiconductor component is in the illumination mode, instructing capture of the respective image without modifying the other rolling shutter exposure window.

9. The method of claim 6, further comprising:
   for subsequent image captures:
      determining a respective rolling shutter exposure window based at least in part on criteria other than the determined frequency of the ambient light for a respective image;
      analyzing a respective ambient light detection signal from the semiconductor component for the respective image to determine a respective period of ambient light frequency;
      determining a respective exposure window adjustment based on the respective period of ambient light frequency; and
      for each image capture with a respective determined exposure window adjustment that meets or exceeds an exposure threshold,
         capturing the associated image without modifying the determined other exposure window.

10. The method of claim 9, wherein the threshold is set based at least in part on whether the modification would cause overexposure of the respective captured image.

11. The method of claim 6, further comprising:
    prior to said determining the adjustment for the rolling shutter exposure window,
       determining the exposure window based at least in part on criteria other than the determined frequency of the ambient light; and wherein said modifying the rolling shutter exposure window modifies the determined exposure window that is based at least in part on the criteria other than the determined frequency.

12. The method of claim 11, wherein the criterion other than the determined frequency of the ambient light comprises, a high speed camera mode or other configuration settings of the image capture device, or a brightness level of the ambient light.

13. The method of claim 6, further comprising capturing, based on the modified rolling shutter exposure window, image data for an image.

14. A device, the device comprising:
an image sensor configured to capture image data for an image in the image sensor's field of view, wherein the image data is captured based at least in part on rolling shutter exposure;
one or more components configured to:
receive an ambient light detection signal from a semiconductor component that receives ambient light and produces an ambient light detection signal based on the received ambient light;
determine a frequency of the ambient light based on analysis of the ambient light detection signal;
modify an exposure window for capturing portions of the image data according to the rolling shutter exposure, wherein modify includes modify the exposure window based at least in part on the determined frequency of the ambient light without causing overexposure; and
capture the associated image in accordance with the modification of the exposure window.

15. The device of claim 14, wherein the one or more components further comprise:
a bandpass filter configured to filter the ambient light detection signal, and an amplifier configured to amplify the filtered ambient light detection signal.

16. The device of claim 15, wherein the one or more components further comprise a zero-cross detector configured to receive the filtered and amplified ambient light detection signal and output a phase-based signal associated with the determined frequency.

17. The device of claim 16, wherein the one or more components comprise a frequency detector configured to:
receive the output signal from the zero-cross detector,
determine a frequency of the ambient light detection signal based at least in part on the signal from the zero-cross detector, and
output frequency information associated with the determined frequency of the ambient light detection signal.

18. The device of claim 17, wherein the output frequency information associated with the determined frequency of the ambient light detection signal comprises a period of the frequency of the ambient light.

19. The device of claim 14, wherein the device comprises an I²C bus for attaching to other devices.

20. The device of claim 14, wherein the device comprises an image processor configured to instruct processing of captured image data or a flash driver configured to drive the semiconductor component.

* * * * *